(12) United States Patent
Wu (10) Patent No.: US 6,769,818 B2
(45) Date of Patent: Aug. 3, 2004

(54) TRANSCEIVER MODULE WITH A CLIPPING DEVICE USED IN AN OPTICAL FIBER COMMUNICATIONS SYSTEM

(75) Inventor: Hung-Yi Wu, Chi-Lung (TW)

(73) Assignee: Sampo Corporation, Tao-Yuan Hsin (TW)

( * ) Notice: Subject to any disclaimer, the term of this patent is extended or adjusted under 35 U.S.C. 154(b) by 226 days.

(21) Appl. No.: 09/683,723

(22) Filed: Feb. 7, 2002

(65) Prior Publication Data

US 2003/0002823 A1 Jan. 2, 2003

(30) Foreign Application Priority Data

Jun. 28, 2001 (TW) ........................................ 90115842 A (51) Int. Cl.[7] ................................................. G02B 6/36
(52) U.S. Cl. ............................. 385/92; 385/88; 385/89
(58) Field of Search .............................. 385/88, 89, 92; 439/374, 577; 359/152

(56) References Cited

U.S. PATENT DOCUMENTS

| | | | | |
|---|---|---|---|---|
| 5,980,324 A | * | 11/1999 | Berg et al. .................. | 439/630 |
| 6,264,481 B1 | * | 7/2001 | Kozel et al. .................. | 439/92 |
| 6,347,954 B1 | * | 2/2002 | Jones et al. .................. | 439/358 |

* cited by examiner

Primary Examiner—Rodney Bovernick
Assistant Examiner—Juliana Kang
(74) Attorney, Agent, or Firm—Winston Hsu (57) ABSTRACT

A transceiver module is used in an optical fiber communications system. The optical fiber communications system includes a housing, a connector for connecting with the housing, an optical sub assembly (OSA) installed within the connector for receiving or emitting optical signals, a printed circuit board (PCB) installed within the housing for processing photoelectric signals, and a clipping device disposed within the housing for fixing the OSA so that the OSA is electrically connected with the PCB.

15 Claims, 11 Drawing Sheets

TRANSCEIVER MODULE WITH A CLIPPING DEVICE USED IN AN OPTICAL FIBER COMMUNICATIONS SYSTEM

BACKGROUND OF INVENTION

1. Field of the Invention

The present invention relates to a transceiver module used in an optical fiber communications system. Specifically, the present invention discloses a transceiver module with a clipping device for the optical fiber communications system.

2. Description of the Prior Art

In recent years, technology of optical fiber communications has had obvious growth and advancement. A frequency of light waves is higher than a frequency of radio waves. Therefore, systems which utilize light functioning as a carrier wave have broad bandwidth to transmit a substantial amount of information and messages.

Figure 1:
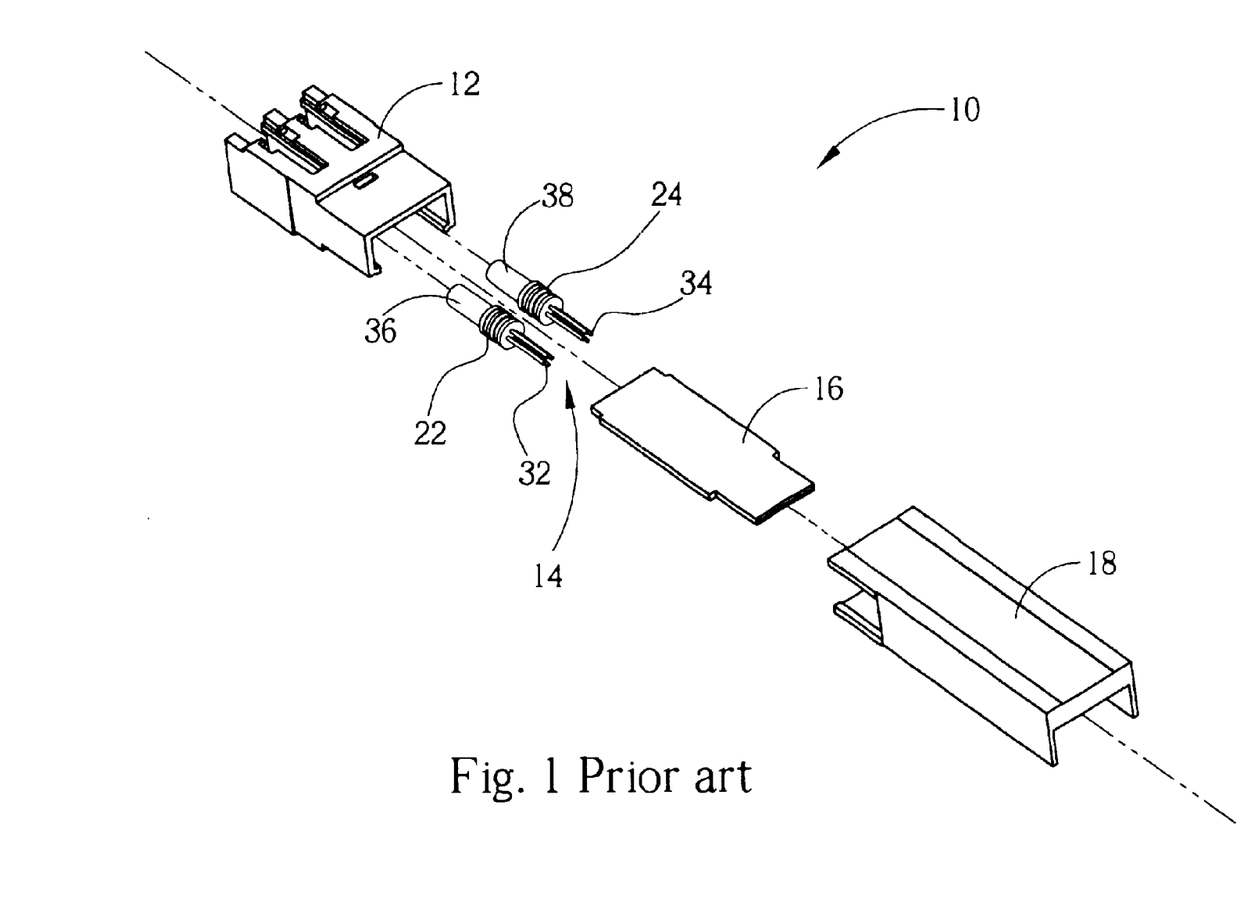
FIG. 1 is an exploded diagram of a transceiver module used in an optical fiber communications system according to the prior art.

Please refer to FIG. 1. FIG. 1 is an exploded diagram of a transceiver module 10 used in an optical fiber communications system according to the prior art. The transceiver module 10 comprises a housing 18, a connector 12 for connecting with the housing 18, an optical sub assembly (OSA) 14 installed within the connector 12 for receiving or emitting optical signals, and a printed circuit board (PCB) 16 installed within the housing 18 for processing photoelectric signals. The OSA 14 comprises an optical emitter 22 having a first end 36 connected to an optical fiber so as to transmit optical signals to the optical fiber, and an optical receiver 24 having a first end 38 connected to the optical fiber so as to receive optical signals from the optical fiber. Furthermore, the optical emitter 22 and the optical receiver 24 each comprise a second end having four pins 32 and 34 for electrically connecting to the PCB 16.

Figure 2:
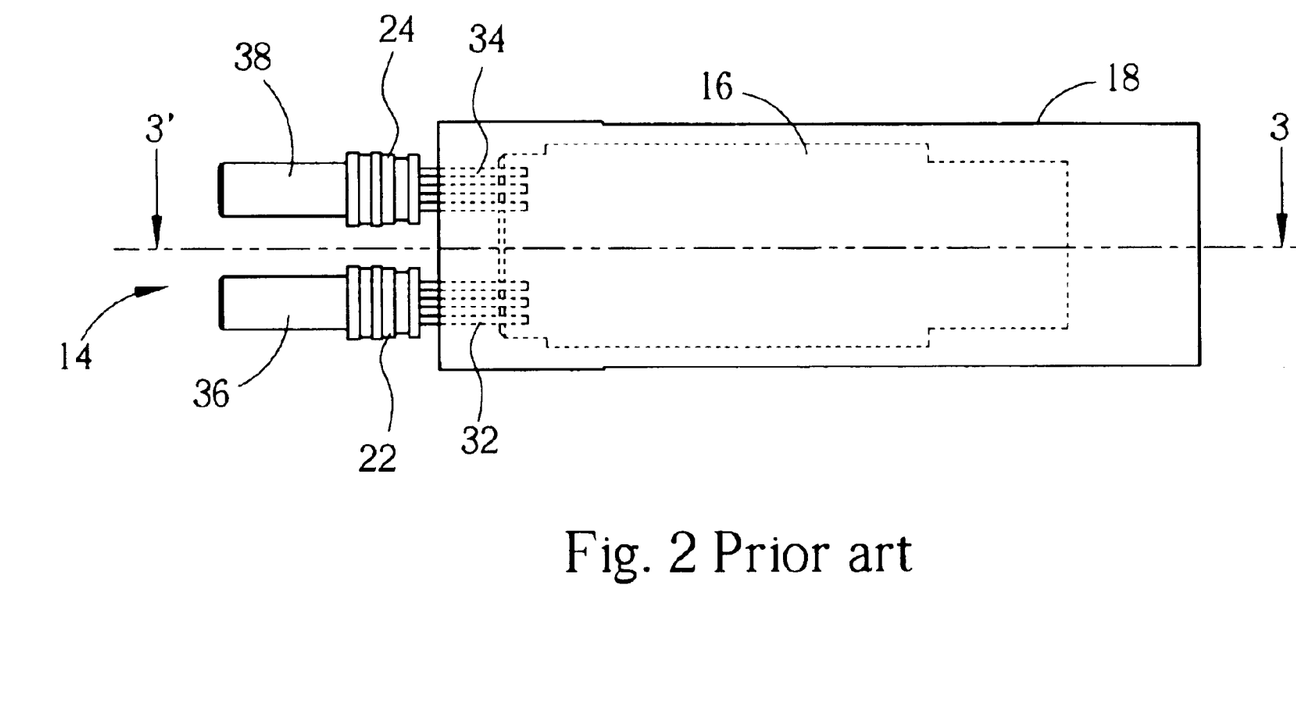
FIG. 2 is a vertical view of an optical sub assembly connected with a printed circuit board of the transceiver module depicted in FIG. 1.
Figure 3A:
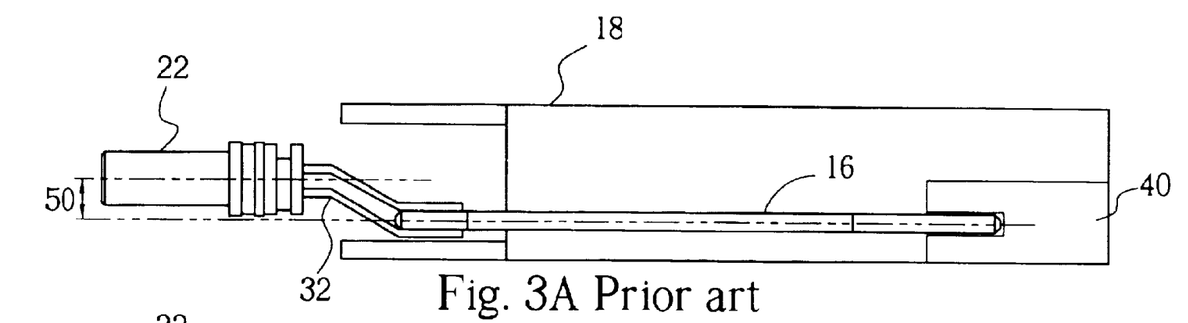
FIG. 3A is a side view of the optical sub assembly connected with the printed circuit board of the transceiver module depicted in FIG. 2.
Figure 3B:
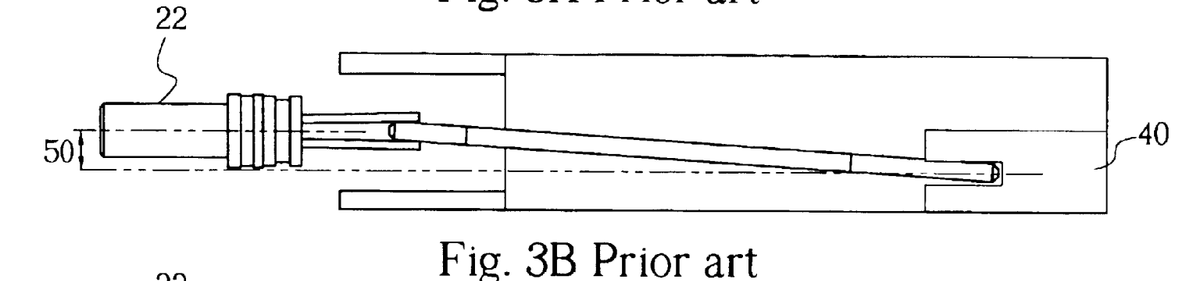
FIG. 3B is a side view of the transceiver module depicted in FIG. 2 when the optical sub assembly connects the printed circuit board under an unfavorable process such as welding or soldering.
Figure 3C:
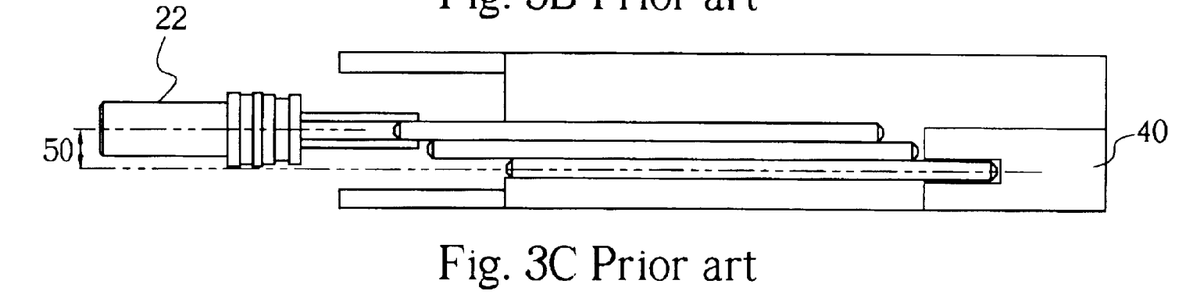
FIG. 3C is a side view of the transceiver module depicted in FIG. 2 which utilizes a plurality of printed circuit boards to overlap so as to connect the optical sub assembly with the printed circuit board.

Please refer to FIG. 2 through FIG. 3C. FIG. 2 is a vertical view of the optical sub assembly 14 connected to the printed circuit board 16 of the transceiver module 10 depicted in FIG. 1. FIG. 3A is a side view of the optical sub assembly 14 connected to the printed circuit board 16 of the transceiver module 10 depicted in FIG. 2 along a dotted line 3—3. FIG. 3B is a side view of the transceiver module 10 depicted in FIG. 2 along the dotted line 3—3 when the optical sub assembly 14 connects to the printed circuit board 16 under an unfavorable process such as welding or soldering. FIG. 3C is a side view of the transceiver module 10 depicted in FIG. 2 along the dotted line 3—3 which utilizes a plurality of printed circuit boards 16 to overlap so as to connect the optical sub assembly 14 with the printed circuit board 16. As shown in FIG. 2 and FIG. 3A, the pins 32 and 34 of the optical receiver 24 and the optical emitter 22 of the OSA 14 are electrically connected to the PCB 16 for the transmission of photoelectric signals in the optical fiber communications system. The pins 32 and 34 of the optical emitter 22 and the optical receiver 24 are usually soldered or welded onto the PCB 16 according to the prior art. Design of the transceiver module 10 must obey a regulation of Small Form-factor Pluggable Transceiver Multi-Source Agreement, which states that there must be a distance 50 between centers of the optical receiver 24 or the optical emitter 22 and the center of the PCB 16. A space of a certain range must be maintained, and this results in the pins 32 or 34 of the optical emitter 22 or the optical receiver 24 not matching the position of the PCB 16. Therefore, front ends of the pins 32 or 34 of the optical receiver 22 or the optical emitter 24 need to be deformed or connected with soft lines so as to connect with the PCB 16 by a soldering or welding process.

As shown in FIG. 3B, when the pins 32 or 34 of the optical receiver 22 or the optical emitter 24 are soldered or welded onto the PCB 16, the soldering or welding process causes PCB 16 to depart from its original center after connection with the pins 32 or 34 of the optical receiver 22 or the optical emitter 24. A fixed end 40 positioned at the end of PCB 16 connected with the housing 18 will result in a situation of bad contact, and the transmission of the photoelectric signals will be incorrectly transmitted. Additionally, the pins 32 or 34 of the optical receiver 22 or the optical emitter 24 are formed of slim metal lines. When the optical fiber communications system 10 is used for several years, welding points or soldering points of the pins 32 or 34 connected with the PCB 16 cause the pins 32 or 34 to become loose or broken by the weight of the PCB 16.

As shown in FIG. 3C, the prior art utilizes a plurality of PCBs 16 to overlap so as to obey the regulation of Small Form-factor Pluggable Transceiver Multi-Source Agreement, which states that there must be the distance 50 between the centers of the optical receiver 24 or the optical emitter 22 and the center of the PCB 16. A space of the certain range is achieved by overlapping the plurality of PCBs 16 so that the pins 32 or 34 of the optical emitter 22 or the optical receiver 24 match the PCB 16. For aforementioned reasons, some extra PCBs 16 need to be installed within the optical fiber communications system 10, thus increasing the cost of the optical fiber communications system 10.

SUMMARY OF THE INVENTION

It is therefore a primary objective of the claimed invention to provide a transceiver module with a clipping device used in an optical fiber communications system for solving the abovementioned problems.

The claimed invention discloses a transceiver module for an optical fiber communications system. The optical fiber communications system comprises a housing, a connector for connecting with the housing, an optical sub assembly (OSA) installed within the connector for receiving or emitting optical signals, a printed circuit board (PCB) installed within the housing for processing photoelectric signals, and a clipping device disposed within the housing for fixing the OSA so that the OSA is electrically connected with the PCB.

It is an advantage of the claimed invention that the clipping device has a fixing function for the transceiver module and a function of changing shape for the pins of the optical sub assembly so as to connect touching points or surfaces of the printed circuit board in accordance with a uniform standard.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 4:
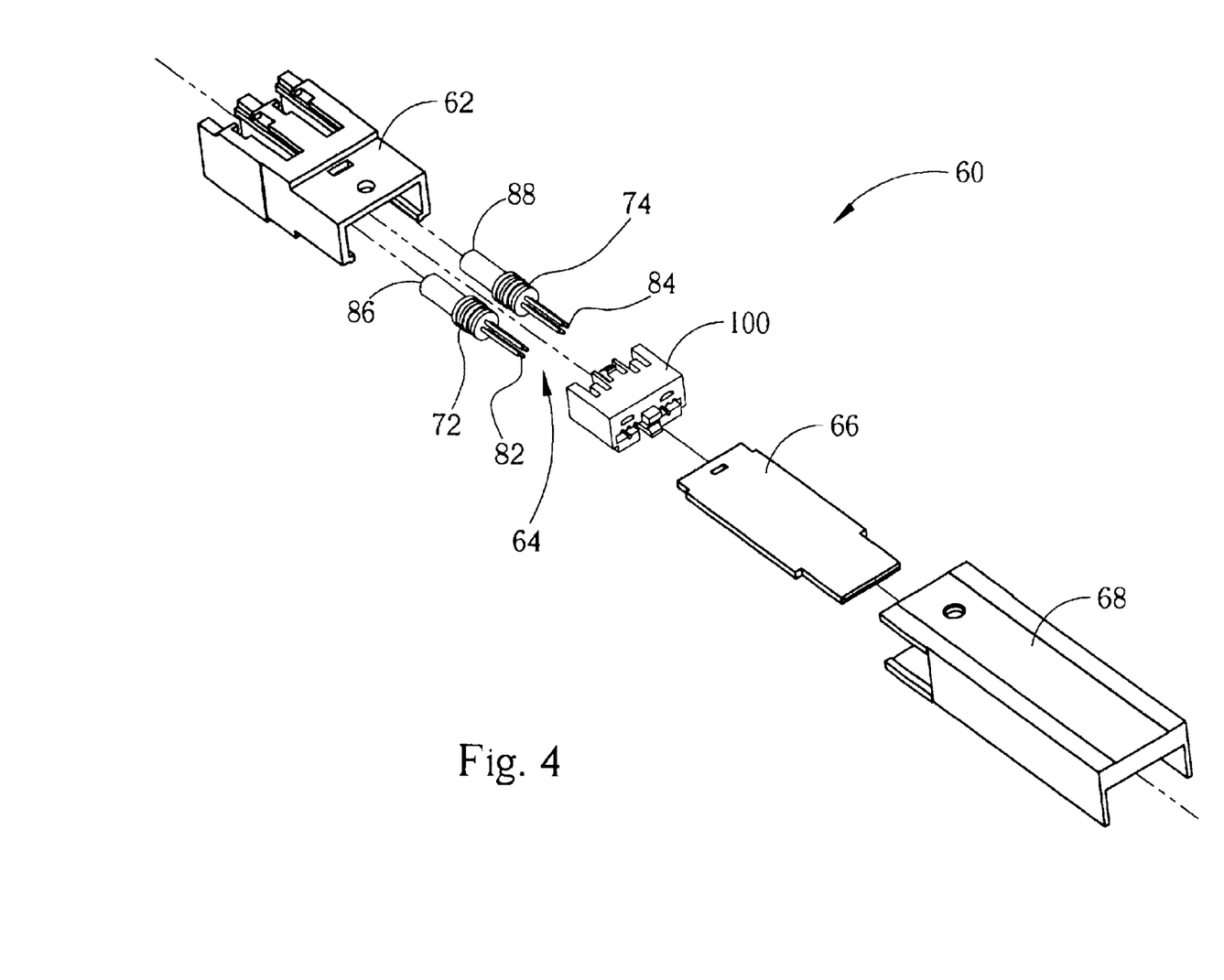
FIG. 4 is an exploded diagram of a transceiver module used in an optical fiber communications system according to the present invention.

Please refer to FIG. 4. FIG. 4 is an exploded diagram of a transceiver module 60 used in an optical fiber communications system according to the present invention. The transceiver module 60 comprises a housing 68, a connector 62, an optical sub assembly (OSA) 64, a printed circuit board (PCB) 66, and a clipping device 100. The OSA 64 comprises an optical emitter 72 and an optical receiver 74 each respectively having four pins 82 and 84 on a second end.

The OSA 64 of the transceiver module 60 is installed within the connector 62 for receiving or emitting optical signals. The optical emitter 72 has a first end 86 connected to an optical fiber so as to transmit optical signals to the optical fiber. The optical receiver 74 has a first end 88 connected to an optical fiber so as to receive optical signals from the optical fiber. Furthermore, the second ends of the optical emitter 72 and the optical receiver 74 are both four pins 82 and 84 electrically connected with the PCB 66 installed within the housing 68. They are used to process photoelectric signals in the optical fiber communications system through the guiding and fixing action of the clipping device 100. The connector 62 connects the housing 68.

Figure 5:
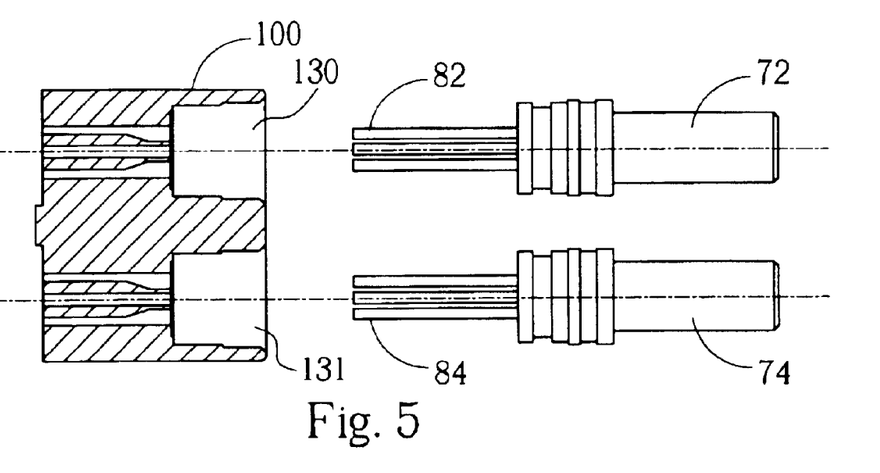
FIG. 5 through FIG. 7 are state diagrams of a clipping device of a first preferred embodiment fabricating with an optical sub assembly from beginning to end according to the present invention.
Figure 6:
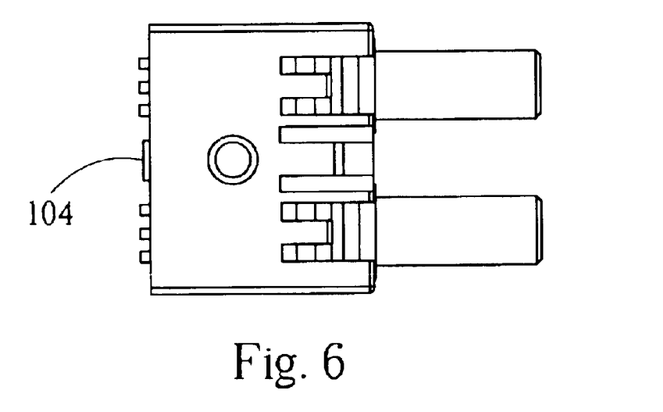
Figure 7:
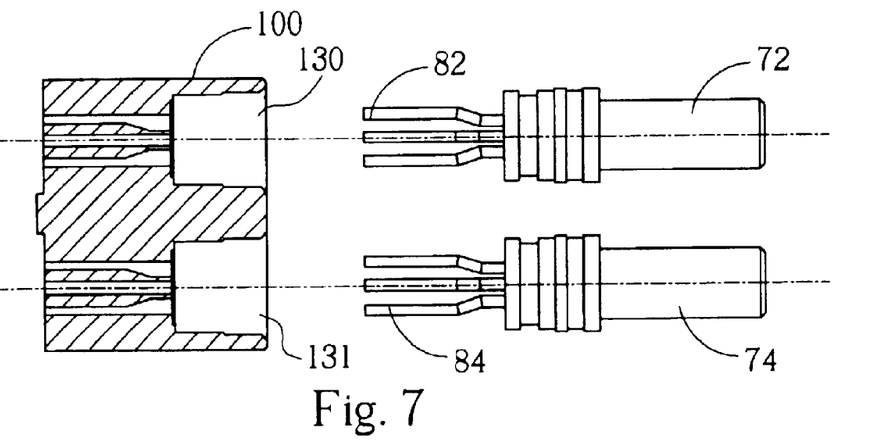
Figure 8:
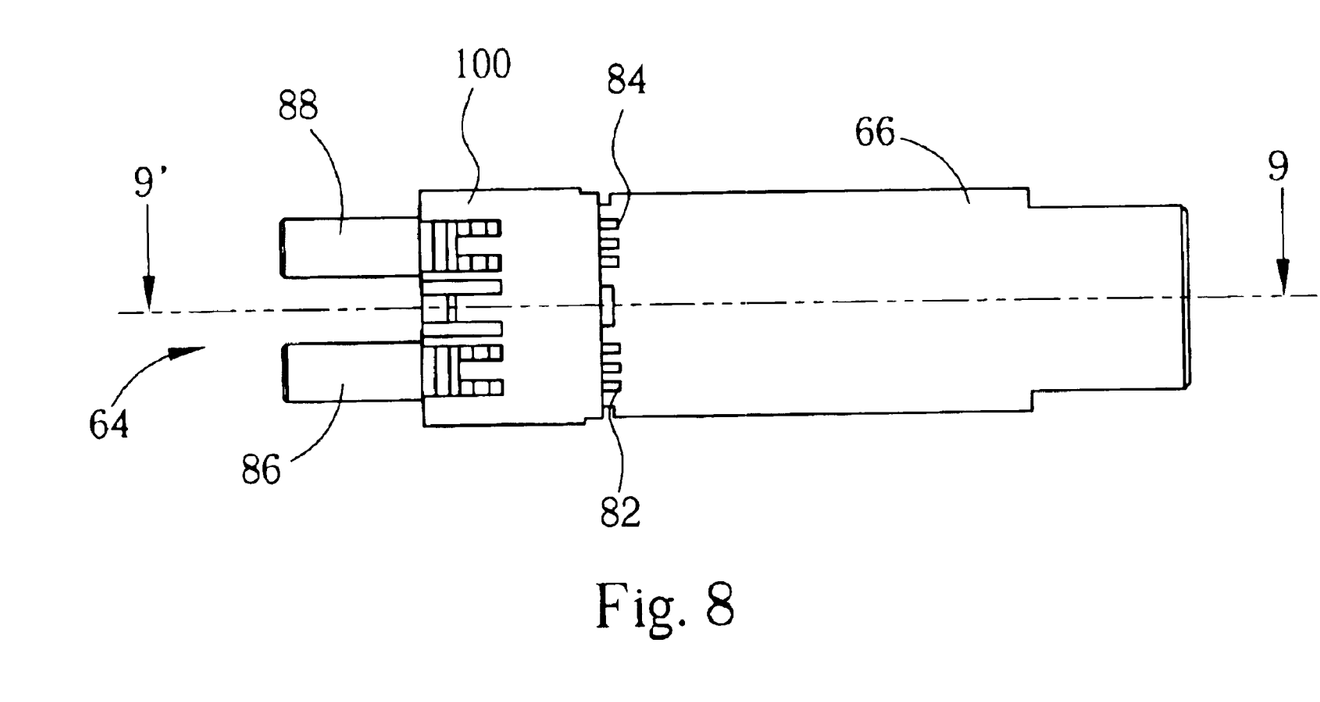
FIG. 8 is a vertical view of the optical sub assembly of the transceiver module of the optical fiber communications system connected with a printed circuit board according to the present invention.
Figure 9:
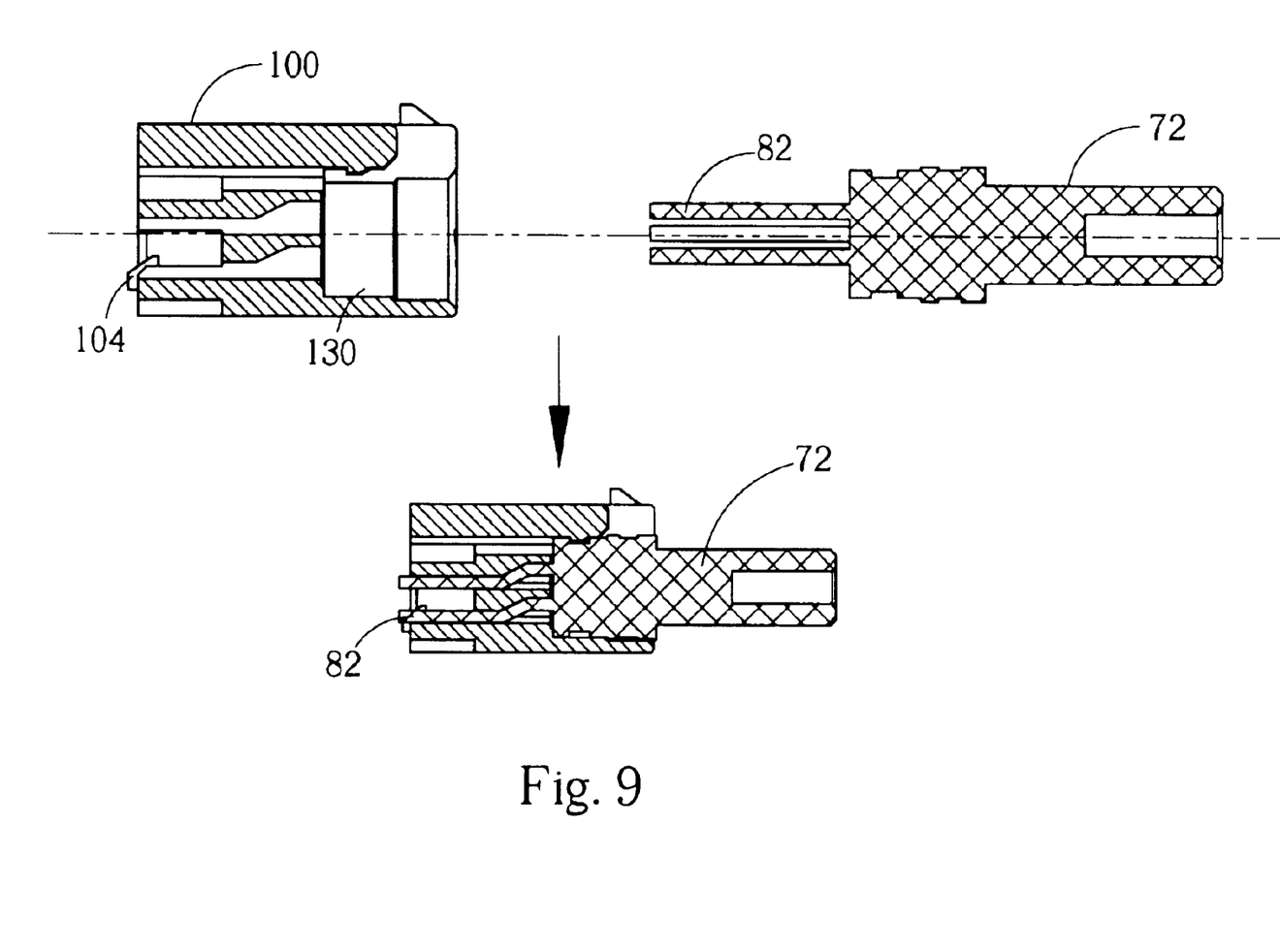
FIG. 9 is a side view of the clipping device of the first preferred embodiment fabricating with the optical sub assembly from beginning to end according to the present invention.

Please refer to FIG. 5 through FIG. 9. FIG. 5 through FIG. 7 are state diagrams of a clipping device 100 of a first preferred embodiment showing the fabrication of the OSA 64 from beginning to end according to the present invention. FIG. 8 is a vertical view of the OSA 64 of the transceiver module 60 of the optical fiber communications system connected with the PCB 66 according to the present invention. FIG. 9 is a side view of the clipping device 100 of the first preferred embodiment fabricated with the OSA 64 along the dotted line 9—9 from beginning to end according to the present invention. As shown from FIG. 5 through FIG. 8, the clipping device 100 comprises two guiding slots 130 and 131. Each guiding slot 130 and 131 has four channels for guiding the pins 82 and 84 of the optical emitter 72 and the optical receiver 74 through the channels to achieve an ideal predetermined position so as to connect to the PCB 66. The number of channels of the guiding slots 130 and 131 are respectively in accordance with the number of the pins 82 and 84 of the optical emitter 72 and the optical receiver 74. The shape of the channels of the guiding slots 130 and 131 obey the regulation of Small Form-factor Pluggable Transceiver Multi-Source Agreement. Furthermore, the clipping device 100 comprises a hook 104 for inserting into an opening 106 of the PCB 66 (as shown in FIG. 10) so that the PCB 66 is fixed between the clipping device 100 and the housing 68.

As shown in FIG. 9, the present invention clipping device 100 is formed of plastic material. When the positions of the optical emitter 72, the optical receiver 74 and the PCB 66 are fixed, a user can design the channels of the clipping device 100 so that the pins 82 and 84 are soldered or welded onto the PCB 66 after the pins 82 and 84 of the optical emitter 72 and the optical receiver 74, achieving the ideal predetermined positions through the channels. The pins 82 and 84 are made of slim metal lines, so the present invention does not need to change the shape of the pins 82 and 84 by guiding action of the clipping device 100. This increases the useful life of the pins 82 and 84, and further improves defects of the prior art.

Figure 10:
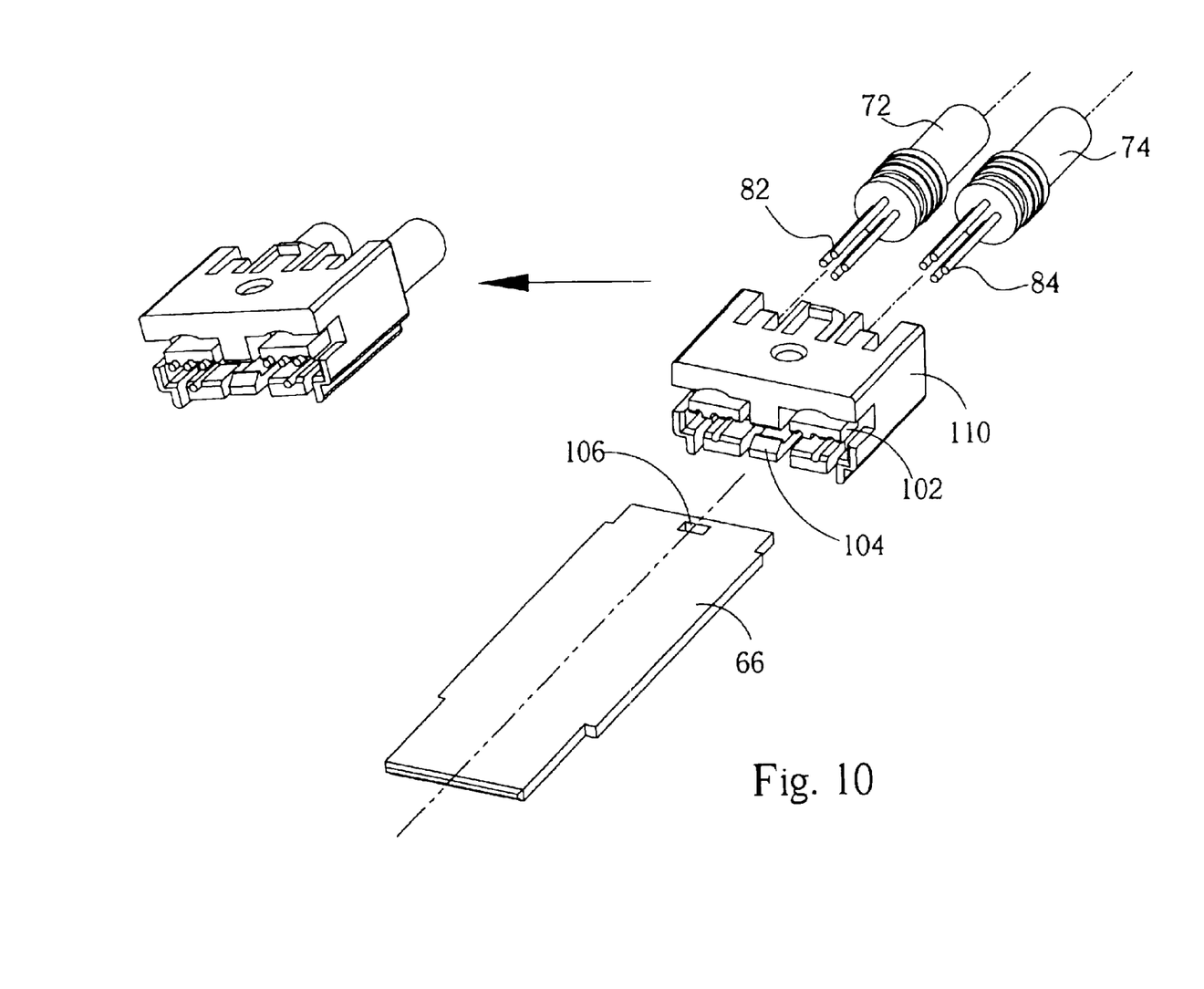
FIG. 10 is a state diagram of a clipping device of a second preferred embodiment fabricating with an optical sub assembly from beginning to end according to the present invention.

Please refer to FIG. 10. FIG. 10 is a state diagram of a clipping device 110 of a second preferred embodiment showing the fabrication of the OSA 66 from beginning to end according to the present invention. The clipping device 110 further comprises two clamping arms 102 respectively disposed on the guiding slots 130 and 131 and monolithically formed with the clipping device 110 for clamping the pins 82 and 84 of the optical emitter 72 and the optical receiver 74 with the PCB 66 so as to fix the pins 82 and 84 on the PCB 66. The pins 82 and 84 of the optical emitter 72 and the optical receiver 74 are tightly contacted with the PCB 66 by the hook 104 clamping tightly with an opening 106 on the PCB 66 so that the optical emitter 72 and the optical receiver 74 can transmit the photoelectric signals with the PCB 66. Furthermore, the clamping arms 102 are also formed of plastic material, so the clamping arms 102 having plasticity, clamp the pins 82 and 84 of the optical emitter 72 and the optical receiver 74 with the PCB 66 so as not to damage the PCB 66. Therefore, the useful life of the pins 82 and 84 is increased.

Figure 11A:
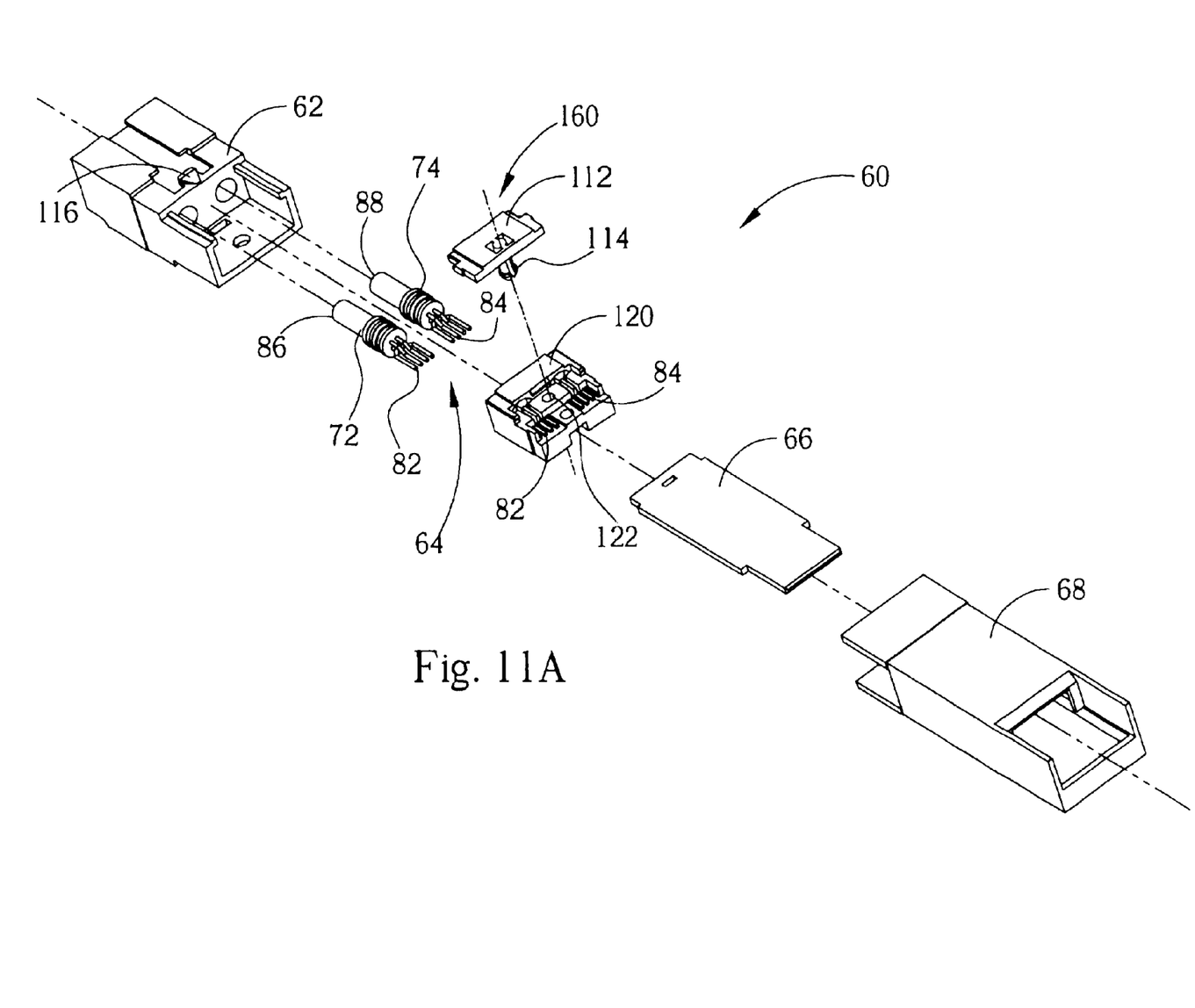
FIG. 11A is an exploded diagram of a transceiver module of a third preferred embodiment according to the present invention.
Figure 11B:
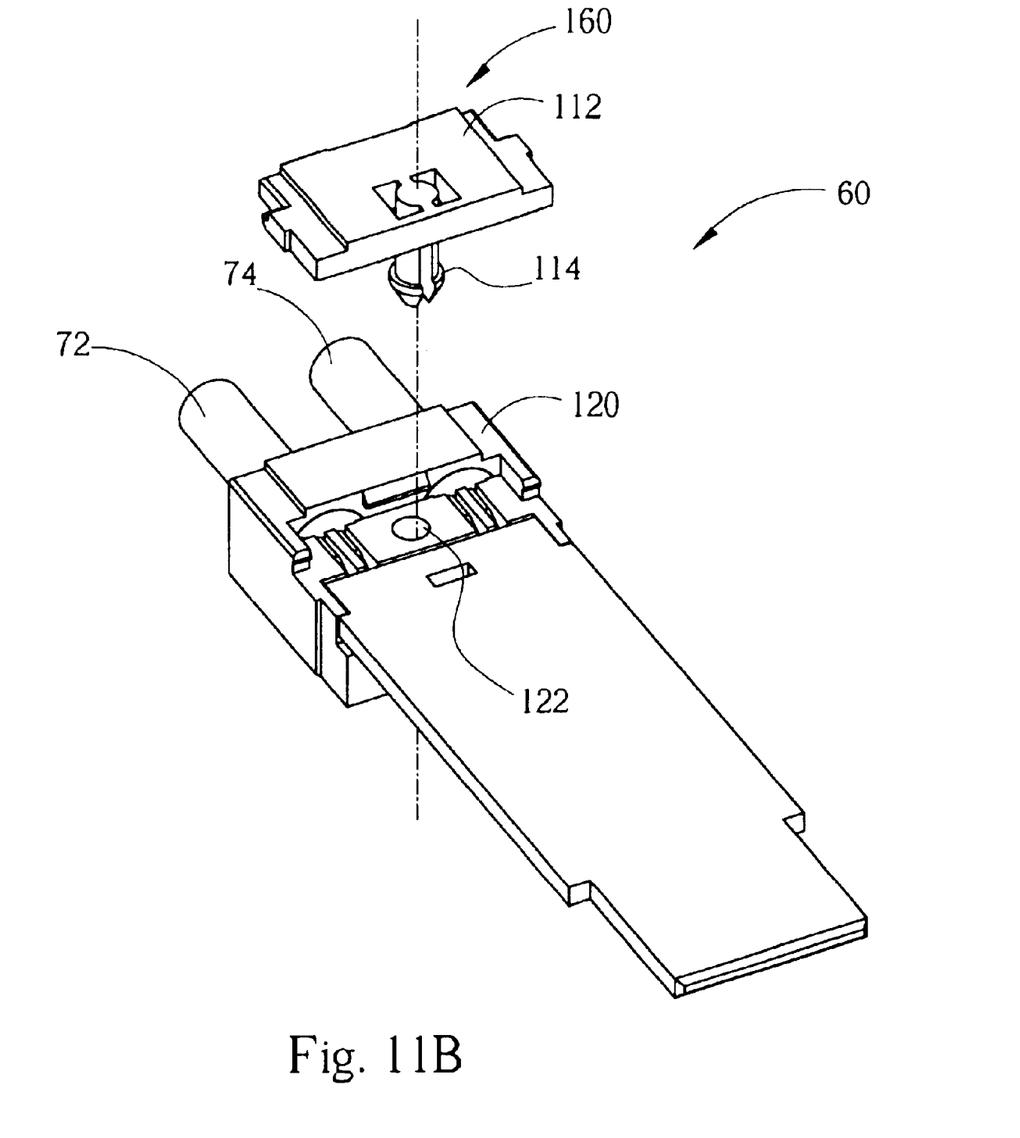
FIG. 11B is a diagram of a clipping device of the third preferred embodiment connected to a printed circuit board after fabricating with an optical sub assembly according to the present invention.

Please refer to FIG. 11A and FIG. 11B. FIG. 11A is an exploded diagram of the transceiver module 60 of a third preferred embodiment according to the present invention. FIG. 11B is a diagram of a clipping device 120 of the third preferred embodiment connected to the PCB 66 after fabrication with the OSA 64 according to the present invention. As shown in FIG. 11A and FIG. 11B, the transceiver module 60 further comprises a clamping device 160 disposed on the clipping device 120. The clamping device 160 comprises a clamping plate 112 and a rod 114 for inserting into a hole 122 of the clipping device 120 so as to clamp the PCB 66 between the pins 82 or 84 of the optical emitter 72 or the optical receiver 74 and the clamping plate 112. After clamping the PCB 66 between the clamping plate 112 and the pins 82 or 84, the pins 82 or 84 are tightly clamped between the clamping plate 112 and the PCB 66 by a fixing bolt 116 of the connector 62 so as to connect the connector 62. This is the same as the clipping device 110 of the second preferred embodiment. The clipping device 120 also does not need to utilize the means of soldering or welding and the pins 82 or 84 are tightly contacted with the PCB 66 so as to transmit the photoelectric signals between OSA 64 and the PCB 66.

Figure 12:
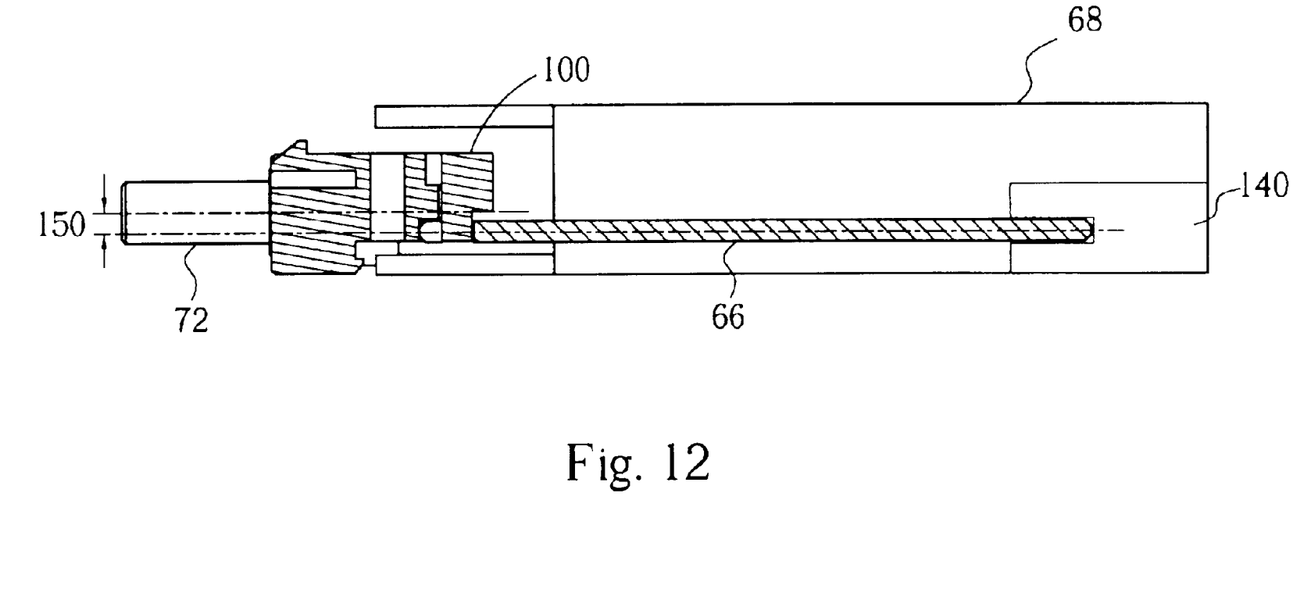
FIG. 12 is a side view of components of the transceiver module fabricated according to the present invention.

In contrast to the prior art, each of the present invention clipping devices 100, 110 and 120 has a fixing function for the transceiver module 60 and a function of changing shape for the pins 82 and 84 of the OSA 64 so as to connect touching points or surfaces of the PCB 66 in accordance with a uniform standard. Please refer to FIG. 12. FIG. 12 is a side view of components of the transceiver module 60 fabricated along the dotted line 9—9 according to the present invention. The PCB 66 is fixed at a fixing end 140 within the housing 68. A distance 150 of the protocol between the centers of the PCB 66 and OSA 64 after connection in the present invention clipping devices 100, 110 and 120 is completely in accordance with the regulation of Small Form-factor Pluggable Transceiver Multi-Source Agreement.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A transceiver module for a fiber optic communications system comprising:
   a housing;
   a connector for connecting with the housing;
   a printed circuit board (PCB) installed within the housing for processing photoelectric signals;
   an optical sub assembly (OSA) installed within the connector for receiving or emitting optical signals, the optical sub assembly comprising an optical emitter having a first end connected to an optical fiber to transmit optical signals to the optical fiber, and an optical receiver having a first end connected to the optical fiber to receive optical signals from the optical fiber, the optical emitter and the optical receiver each comprising a second end having a plurality of pins to electrically connect to the printed circuit board; and
   a clipping device disposed within the housing for fixing the optical sub assembly so that the optical sub assembly is electrically connected with the printed circuit board, the clipping device comprising guiding slots for guiding the pins disposed therein to the printed circuit board and further comprising clamping arms for clamping the pins of the optical emitter and the optical receiver with the printed circuit board to fix the pins on the printed circuit board.

2. The transceiver module of claim 1 wherein the clipping device comprises a hook for inserting into an opening of the printed circuit board so that the printed circuit board is fixed within the clipping device.

3. The transceiver module of claim 1 wherein the pins are soldered or welded onto the printed circuit board.

4. The transceiver module of claim 1 wherein the clipping device is formed of plastic material.

5. The transceiver module of claim 1 wherein each guiding slot comprises a plurality of nonconductive channels, each channel for guiding one of the pins to a predetermined position to connect to the printed circuit board.

6. A transceiver module for a fiber optic communications system comprising:
   a housing;
   a connector for connecting with the housing;
   a printed circuit board (PCB) installed within the housing for processing photoelectric signals;
   an optical sub assembly (OSA) installed within the connector for receiving or emitting optical signals, the optical sub assembly comprising an optical emitter having a first end connected to an optical fiber to transmit optical signals to the optical fiber, and an optical receiver having a first end connected to the optical fiber to receive optical signals from the optical fiber, the optical emitter and the optical receiver each comprising a second end having a plurality of pins to electrically connect to the printed circuit board;
   a clipping device disposed within the housing for fixing the optical sub assembly so that the optical sub assembly is electrically connected with the printed circuit board, the clipping device comprising guiding slots for guiding the pins to the printed circuit board; and
   a clamping device having a clamping plate and a rod for inserting into a hole of the clipping device to clamp the printed circuit board between the plurality of pins and the clamping plate.

7. The transceiver module of claim 6 wherein each guiding slot comprises a plurality of nonconductive channels, each channel for guiding one of the pins to a predetermined position to connect to the printed circuit board.

8. A transceiver module for a fiber optic communications system comprising:
   a housing;
   a connector for connecting with the housing;
   a printed circuit board installed within the housing for processing photoelectric signals;
   a clipping device disposed within the housing, the clipping device comprising a first guiding slot, the first guiding slot comprising a first plurality of electrically nonconductive channels; and
   an optical emitter having a first end connected to a first optical fiber to transmit optical signals to the first optical fiber and a second end having a first plurality of pins, the optical emitter being disposed within the first guiding slot of the clipping device and each of the first plurality of pins of the optical emitter being uniquely disposed within one of the first channels to guide each of the first plurality of pins to a predetermined location for electrical connection to the printed circuit board.

9. The transceiver module of claim 8 wherein the clipping device further comprises a second guiding slot, the second guiding slot having a second plurality of electrically nonconductive channels.

10. The transceiver module of claim 9 further comprising an optical receiver having a first end connected to a second optical fiber to receive optical signals from the second optical fiber and a second end having a second plurality of pins, the optical receiver being disposed within the second guiding slot of the clipping device and each of the second plurality of pins of the optical receiver being uniquely disposed within one of the second plurality of channels to position each of the second plurality of pins in predetermined locations for electrical connection to the printed circuit board.

11. The transceiver module of claim 10 wherein the clipping device further comprises a clamping device to fix the first and second plurality of pins on the printed circuit board.

12. The transceiver module of claim 11 wherein the clamping device comprises clamping arms for clamping the first and second plurality of pins to the printed circuit board.

13. The transceiver module of claim 11 wherein the clamping device comprises a clamping plate and a rod for inserting into a hole of the clipping device to clamp the printed circuit board between the first plurality of pins and the clamping plate.

14. The transceiver module of claim 8 wherein the clipping device further comprises clamping arms for clamping the first plurality of pins of the optical emitter with the printed circuit board to fix the first plurality of pins on the printed circuit board.

15. The transceiver module of claim 8 further comprising a clamping device having a clamping plate and a rod for inserting into a hole of the clipping device to clamp the printed circuit board between the first plurality of pins and the clamping plate.

\* \* \* \* \*